R. S. BRYANT.
RIM FOR VEHICLE WHEELS.
APPLICATION FILED MAY 4, 1911.
1,237,613.
Patented Aug. 21, 1917.
3 SHEETS—SHEET 1.
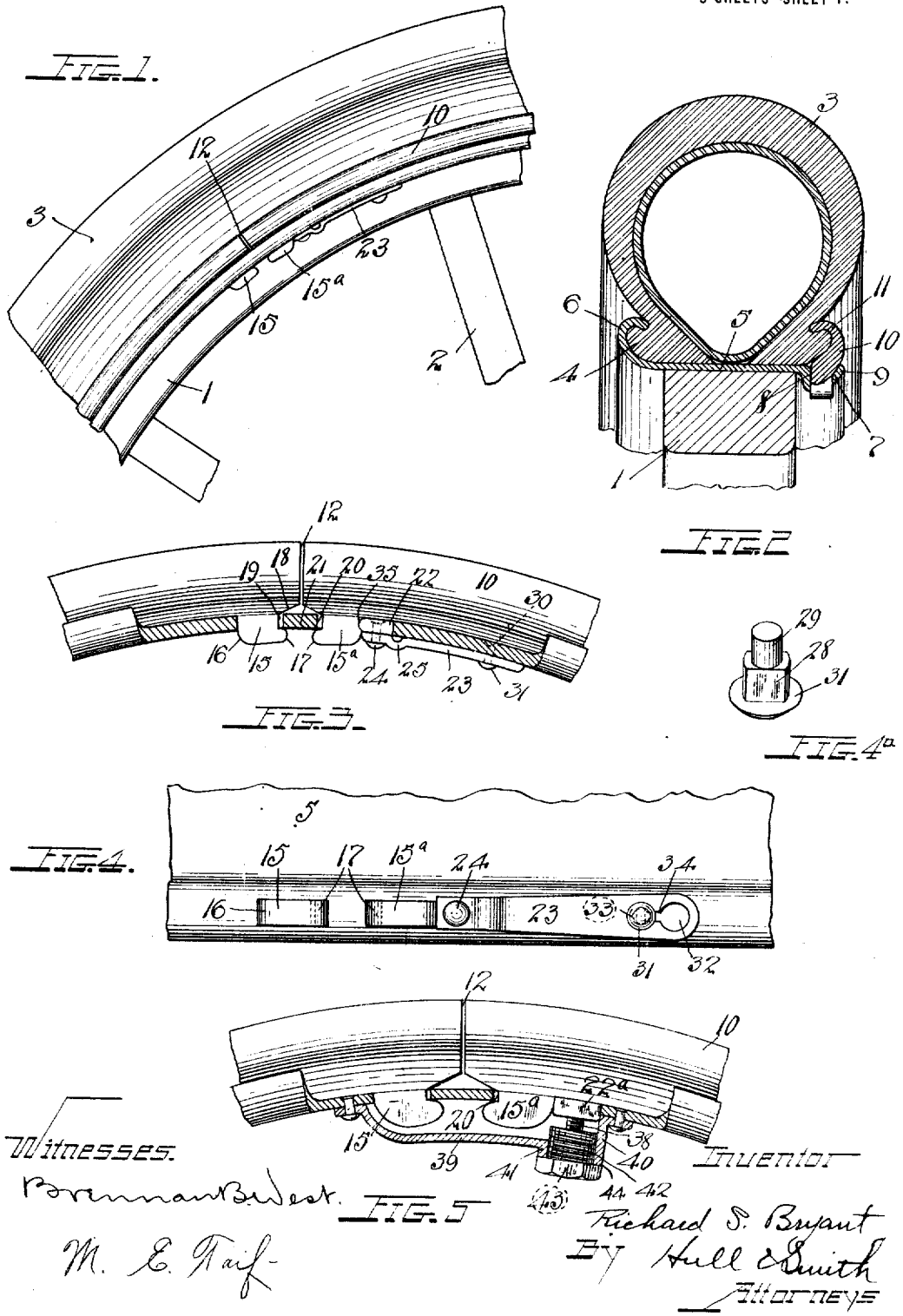

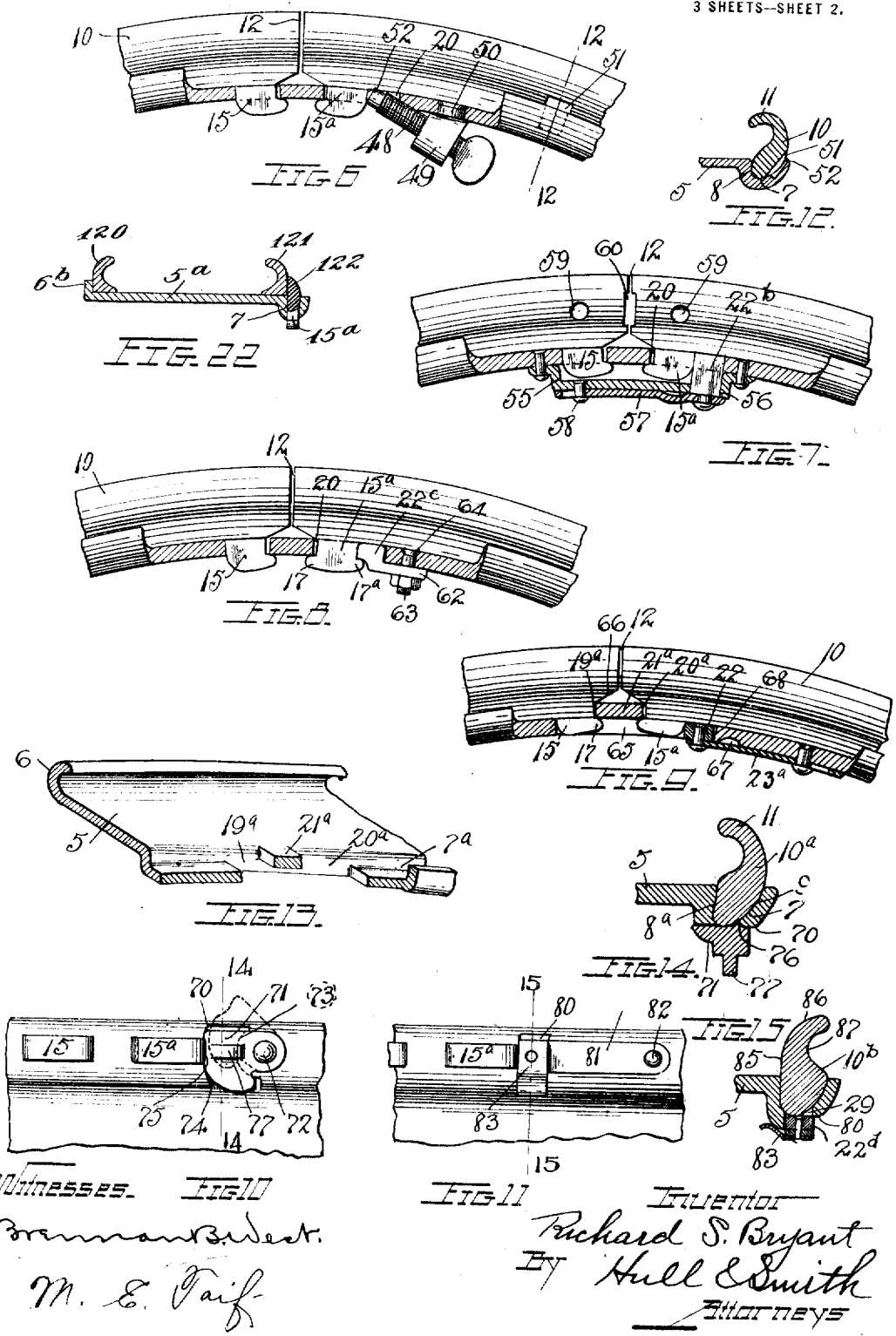

R. S. BRYANT.
RIM FOR VEHICLE WHEELS.
APPLICATION FILED MAY 4, 1911.
1,237,613.
Patented Aug. 21, 1917.
3 SHEETS—SHEET 3.
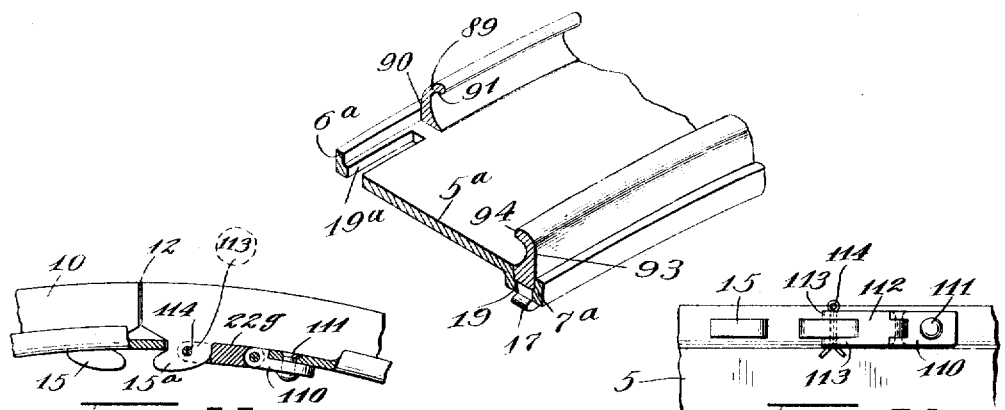
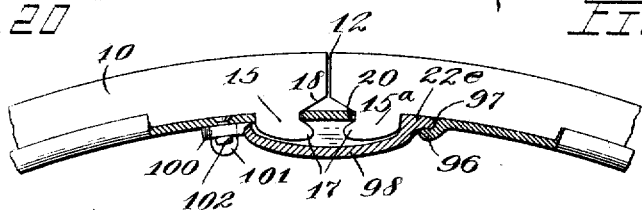
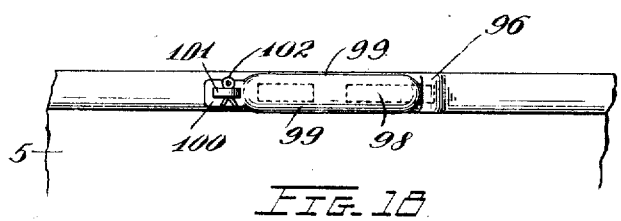
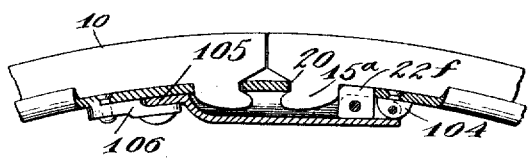
Witnesses:
Inventor.
Richard S. Bryant
By Hull & Smith
Attorneys.

UNITED STATES PATENT OFFICE.

RICHARD S. BRYANT, OF AKRON, OHIO, ASSIGNOR TO THE STANDARD WELDING COMPANY, OF CLEVELAND, OHIO, A CORPORATION OF OHIO.

RIM FOR VEHICLE-WHEELS.

1,237,613. Specification of Letters Patent. Patented Aug. 21, 1917.

Application filed May 4, 1911. Serial No. 625,078.

*To all whom it may concern:*

Be it known that I, RICHARD S. BRYANT, a citizen of the United States, residing at Akron, in the county of Summit and State of Ohio, have invented a certain new and useful Improvement in Rims for Vehicle-Wheels, of which the following is a full, clear, and exact description, reference being had to the accompanying drawings.
This invention relates to rims for vehicle wheels of the type designed to secure a pneumatic or other resilient tire in place thereon and permit the ready removal of the same therefrom for purposes of repair or replacement. These rims are usually formed with an upstanding flange at each side to engage the sides of the tire, said flanges either being hooked inwardly so as to securely grasp the lips of a tire of the "clencher" type, or left with straight sides for the reception of a tire of the straight wall or "Dunlop" type. Various expedients have heretofore been employed for facilitating the removal of the tire from the rim, one of those expedients being the formation of the rim with one, at least, of said side flanges detachably secured thereto so as to be easily removed and permit the tire to be drawn without hindrance over the side of the wheel.

The object of this invention is the provision of a rim of this type having one or both of said flanges removably attached thereto, and provided with novel and improved means for securing said flange in place upon said rim; the provision of a device of this character which can be manipulated with the smallest possible number and variety of tools, and which shall yet serve to retain said detachable flange rigidly and securely in place upon the rim and be proof against accidental disconnection therefrom; the provision of a detachable flange of improved shape whereby the disconnection of the flange from the rim by the pressure of the tire shall be absolutely prevented; and further objects and advantages will become apparent from the following description and claims. Generally speaking, my invention may be defined as consisting of the combinations of elements embodied in the claims hereto annexed and illustrated in the drawings accompanying and forming a part hereof, wherein Figure 1 is a side elevation of a portion of a vehicle wheel provided with my improved rim; Fig. 2 a cross sectional view of the rim and associated parts taken on the line 2—2 of Fig. 1; Fig. 3 a detail view partly in section, illustrating the manner of securing the detachable flange to the rim; Fig. 4 an inside view of a portion of the rim illustrating the securing means; Fig. 4ª a perspective view of a rivet employed in connection with the device shown in Fig. 4; Figs. 5, 6, 7, 8, 9, 10, 11, 17, 18, 19, 20 and 21 are detail views illustrating modified methods of securing the detachable flange to the rim; Fig. 12 is a cross sectional detail view taken upon the line 12—12 of Fig. 6; Fig. 13 is a perspective view of a portion of the rim illustrated in Fig. 9, certain portions thereof being broken away; Fig. 14 is a detail cross sectional view taken on the line 14—14 of Fig. 10 and illustrating a slightly modified shape of flange and flange-receiving groove and a slightly modified filling block; Fig. 15 is a cross sectional view taken on the dotted line 15—15 of Fig. 11; and illustrating a flange of the straight wall type; Fig. 16 is a view partly in perspective and partly in cross section of a modification wherein both flanges are removable and reversible so as to adapt the rim for use with either "clencher" or "straight wall" tires, as may be desired, and Fig. 22 is a cross-sectional view of another form of convertible rim in which one of the flanges is secured by a ring attached in accordance with my invention. Describing the parts by reference characters, 1 indicates the felly of a vehicle wheel, 2 the spokes, and 3 the tire. The tire illustrated is of the pneumatic type, and has lateral flexible lips or beads 4 at the sides of its base which are adapted to be engaged by the flanges of the rim. Said rim consists of a substantially flat annular metallic band 5, shrunk upon or otherwise securely attached to the felly 1 and having at one side the outwardly projecting hooked flange 6 adapted to engage one of the beads 4 of the tire. The other side of the rim is depressed to form a groove or channel 7, having a flat inside wall 8 and a curved outer wall 9, the upper edge of said outer wall being not higher than the flat surface of the band 5. I prefer to form the wall 9 substantially upon the arc of a circle, whose center lies substantially in the plane of the wall 8 and at or slightly above the surface of the band 5. In this groove I secure the removable or detachable flange 10, which has a base or body portion adapted to fit securely within the groove 7 and an inwardly extending hooked portion 11 adapted to engage the base of the tire opposite the fixed flange 6. This flange is made in the form of a split ring, the closely abutting ends thereof being illustrated at 12, and the method of securing this ring in the groove 7 will now be described.

Formed upon the inner surface of the ring 10 adjacent the ends thereof are radial projections 15 and 15$^a$ having rounded heels 16 and forwardly projecting toes 17. The inner surface of the ring between each of the projections and the end 12 is beveled away as at 18 and the bottom of the groove 7 is formed with apertures 19 and 20 separated by a portion or web 21 left intact. The perforation 19 is made in the form of a flat slot of sufficient width to permit the projection 15 to fit closely therein, and of a length greater than that of the projection 15, but less than that of the projection plus the toe 17. One end of the ring is secured to the rim by inserting the projection 15, toe first, into the perforation 19, the necessary canting of the ring being permitted by the beveled portion 18. The ring is then seated in the groove 7. The slot 20 is of the same width as the slot 19 but of considerably greater length thus permitting the direct insertion of the projection 15$^a$ therein, and this projection is secured in place by inserting between its rear edge and the end of the slot 20 a suitable filling device. In Figs. 3 and 4 this filling device is shown as a metallic block 22, the length whereof is sufficient to wedge the toe 17 of the projection 15$^a$ securely beneath the web 21 and bring the ends of the ring closely together. This block is preferably secured to the end of a flat spring 23, in the present instance being shown as secured thereto by the rivet 24, and the spring is here shown as provided with a slight outward bend at 25 to permit the insertion of a tool thereberneath.

Inasmuch as the rim must be heated before being applied to the felly 1, it is inexpedient to secure the spring 23 permanently thereto, since its temper would be impaired by the heat. I prefer to secure the spring to the rim by means of a rivet of the type shown in Fig. 4$^a$. This rivet consists of a flat body portion 28 having a reduced end 29 adapted to be inserted in a suitable perforation in the rim and upset therein, as at 30, and having an enlarged circular head 31. The rivet is secured to the rim with the flat portion transverse thereto, as shown in Fig. 4, and the spring is formed with a circular perforation 32 of a size to slip over the rivet head, a smaller perforation 33 of a diameter equal to the width of the body portion, and a slot 34 connecting these perforations and having a width sufficient to permit the passage of the body portion when turned so as to parallel the flat surface thereof. With this construction, the spring can be applied to the rivet in an obvious manner, and the engagement of the block 22 in the slot 20 will entirely prevent the spring from being turned sidewise in a manner to permit its disconnection. Obviously, however, any form of connection can be employed within the scope of my invention. If desired, the rear end of the projection can be slightly undercut, as at 35, and the corresponding face of the block 22 correspondingly inclined, so that the tendency of the ring to expand will wedge the block more securely to its seat, thus aiding the effect of the spring 23.

In Fig. 5 I have illustrated another method of securing the projection 15$^a$ in place. In this view a block 22$^a$ is illustrated, having on its outer face a right hand threaded stem 38. Securely riveted to the rim is a hollow shell or casing 39 bridging and inclosing the projections 15 and 15$^a$ and having a square end 40 flush with the rear end of the slot 20. Formed upon the outside of this shell opposite the block 22$^a$ is a threaded boss 41, and in this boss is secured a left hand threaded cap nut 42. This cap nut has an axial recess 43 provided with a right hand thread receiving the stem 38, and a terminal flange 44 adapted to seat against the end of the projection 41. When the parts are in the position illustrated in Fig. 5, it is obvious that the ring 10 will be securely held in place by reason of the interposition of the block 22$^a$ between the projection 15$^a$ and the end of the slot 20. If it be desired to release the flange 10, the nut 42 is turned to the right thus withdrawing it partially from the boss 41 and at the same time taking up the stem 38. By reason of the direction of the two sets of threads, the block 22$^a$ is moved twice as rapidly as the nut 42, the rotation of the block 22$^a$ being prevented by its engagement with the wall of the casing. The thickness of the block and the length of the nut are so adjusted that their opposing surfaces will come into contact in advance of the complete withdrawal of the nut, thus preventing the complete removal thereof and efficiently guarding against the loss of any of the parts. Furthermore, the block and nut are so arranged that the block will become exactly seated by the time that the flange 44 engages the end of the boss 41.

In Fig. 6 I have illustrated a third expedient for securing the projection 15$^a$ in place. In this view I have illustrated a thumb screw 48 carried in a nut 49 secured to the rim, as by upsetting or riveting or welding over the end of a projection 50 carried thereby, and having its forward end 52 inserted in the slot 20 so as to bear against the rear end of the projection 15ª and wedge the same securely to its seat. In this view, and in Fig. 12 I have illustrated an expedient for permitting the ready removal of the flange 10 from the rim, in case the same should become "frozen" thereto as by marring or rusting. This expedient consists in forming the adjacent surfaces of the ring and groove with registering recesses 51 and 52, respectively, so as to permit the insertion of a screw driver or other tool therein for prying the ring out of its seat. Obviously, this expedient can be employed in connection with any of the securing devices illustrated in this application.

In Fig. 7 I have illustrated yet another expedient for securing the projection 15ª within the slot 20. In this case, I have illustrated the slots and the projections as housed in a hollow shell or casing 55 secured to the inner surface of the rim and having a perforation 56 therethrough opposite the rear end of the slot 20. A filling block 22ᵇ is mounted in said perforation and extends into the slot 20 in the rear of the projection 15ª. A flat spring 57 is secured to this block, and is attached to the casing by means of the rivet 58, which may, if desired, be of the form illustrated in Fig. 5. The advantage of this arrangement is the complete exclusion of water, sand, and other foreign substances from the flange securing means. In this figure I have illustrated means for permitting the drawing together and separating of the ends of the ring. To permit the first operation, the ends of the ring are provided with recesses 59 adapted to be engaged by the arms of a spanner wrench or other tool; to permit the second operation, the ends of the ring are formed with registering recesses 60 to permit the insertion of a screw driver or other prying tool. These expedients are not confined to the modification illustrated in this figure, but may be employed in connection with any of the modifications illustrated herein. At the same time, it is especially desirable that some such means be provided in case the lugs 15 and 15ª be entirely inclosed as by the casing 55 and direct access thereto thus prevented.

In Fig. 8 I have illustrated still another expedient for securing the projection 15ª within the slot 20. The projection 15ª is here shown as having a toe 17ª upon its rear end in addition to the toe 17 upon its forward end, and a filling block 22ᶜ is employed, having a reduced forward end adapted to fit beneath the toe 17ª and having a rearwardly extending perforated arm 62 adapted to receive the bolt 63 carried by the rim. The length of this block is such as to wedge the toe 17 into proper engagement with the forward end of the slot 20. In this case, the bolt 63 is preferably secured in place by upsetting its inner end as at 64, while the necessary angular movement of the arm 62 can be permitted either by slotting the arm, inclining the bolt, or securing the bolt loosely to the rim.

In Fig. 9 I have illustrated another embodiment, designed especially to prevent the projections 15 and 15ª from extending beyond the inner surface of the rim. In this modification, I provide a web 21ª across the groove 7ª at a point above the bottom thereof, so as to provide an elongated recess 65 within the limits of the annular member. The slots 19ª and 20ª are cut through the bottom of the groove 7ª into this recess as before, and the projections 15 and 15ª are provided with toes 17 as before adapted to engage beneath the web 21ª. In this modification, the ends of the ring are cut away as at 66 to receive the web 21ª, and the projections 15 and 15ª extend downwardly not farther than the wall of the recess 65. The filling block 22 illustrated in this figure is of the same nature as that illustrated in Fig. 3 and is secured to a flat spring 23ª, preferably secured to the rim in the manner illustrated in Fig. 4, though any of the expedients illustrated herein could, obviously, be employed. In this case I have illustrated the rim as formed with a notch 67 to permit the insertion of a tool beneath the spring. I have also disclosed in this figure another expedient for preventing displacement of the block 22ª. This expedient consists in undercutting the rear end of the slot and the corresponding side of the block as at 68. This expedient may be used instead of that shown in Fig. 3.

In Fig. 10, I have illustrated another expedient for securing the projection 15ª in place. In this modification, the side of the rim is cut away as at 70, opposite the rear end of the slot 20, and a cam block 71 is pivoted to the rim so as to swing into the notch so formed and past the rear end of the block 15ª. This pivot preferably takes the form of a rivet 72, and the adjacent wall 73 of the notch is formed upon the arc of a circle described thereabout. The block 71 is formed with an arcuate projection fitting in this notch and against this wall, and the end of the block is formed upon an eccentric 74 adapted to engage the projection 15ª and push it into place. In order to prevent the displacement of the cam block from its seating position, I may form it with a shallow notch 75 in the eccentric portion thereof, so that the elasticity of the split ring may draw the projection 15ª back into this notch and prevent the movement of the block. In Fig. 14 I have illustrated another expedient for preventing displacement of this block, which consists in forming its inner surface with a slight boss or projection 76 adapted to ride over the wall of the rim and snap into the slot 20. This block is not made of tempered metal, but the natural elasticity of most metals is sufficient to permit the desired action in case only a small projection be used. In both these cases I have shown the block 71 as provided with a lug 77 for the reception of a wrench.

In Figs. 11 and 15 I have illustrated yet another expedient for securing the projection 15ª in its slot. In this case, I cut away the side of the rim, as at 80 opposite the rear end of the slot 20, and provide a block 22ᵈ of the proper dimensions to be inserted therein. This block I secure to the end of a pivoted arm 81 swinging about a rivet 82, and having upon its free end a spring latch 83 adapted to engage with the further side of the rim projection, so as to hold the block securely in place.

In Fig. 14 I have illustrated a flange and groove of modified form, in which the inside wall of the groove is made undercut as at 8ª, and the corresponding wall of the flange is complementarily sloped so as to abut securely thereagainst. The outer wall 9 of the groove is made of substantially the same shape as before. Obviously, this formation can be employed in connection with any of the securing expedients herein disclosed.

In Fig. 15 I have illustrated a modified form of flange adapted for use with tires of the straight side or "Dunlop" type. The inner wall of this flange is made straight as at 85 for a distance and then outwardly curved as at 86 in the usual manner. The outer edge of this flange is preferably cut away as at 87 to provide a lighter construction.

In Fig. 16 I have illustrated an interchangeable form of rim adapted for use with tires of both types. In this figure I have illustrated a rim made of a flat annular band 5ª, having on one side the upturned right angular flange 6ª, and upon the other side the symmetrical groove 7ª. Adjacent the flange 6ª the rim is formed with slots 19ª and 20ª, and in the bottom of the groove 7ª are formed the slots 19 and 20. A reversible ring 89, having a straight wall 90 on one side and an inwardly extending lip 91 on the other side is secured adjacent the flange 6ª in the manner hereinbefore described, and a reversible removable flange 92 is secured in the groove 7ª in the same manner. One side of this flange is made straight as at 93, and the other side is provided with a lip 94 similar to the lip 91. Any of the securing expedients herein described can be employed.

In Figs. 17 and 18 I have illustrated yet another expedient for securing the projection 15ª in place. In this modification the metal forming the rear end of the slot 20 is pressed outwardly, as at 96, so as to form a recess 97. A cap or casing is provided having a block 22ᵉ on its end adapted to be inserted into this recess and space the projection 15ª from the rear end of the notch. This casing is preferably formed with a cover 98 and depending side walls 99 adapted to house the projections 15 and 15ª and prevent the access of foreign matter thereto. The forward end of this casing is shown as provided with the perforated lug 100 adapted to be seated over a staple 101 and secured in place by a cotter pin 102, or any other suitable fastening could be employed.

In Fig. 19 I have illustrated a somewhat similar expedient, wherein the rear end of the casing is pivoted to a hinge block 104 riveted to the rim in the rear of the slot 20, and provided with a filling block 22ᶠ, either integral therewith or separately attached thereto, as shown. This casing also covers the projections and slots and is formed at its forward end with a lug 105, here shown as secured to the surface of the rim by means of a button 106. This button is preferably made so as to interlock with the lug 105 so as to retain its position in all incidents of use.

In Figs. 20 and 21 I have illustrated yet another expedient for securing the projection 15ª in place. In this modification a hinge block 110 is secured at the rear end of the slot 20 in any convenient manner as by a rivet 111 and to this hinge block is pivoted a filling block 22ᵍ. This block is preferably provided with lateral lips 112 overhanging the metal at the sides of the slot, and with forwardly extending arms 113 embracing the projection 15ª. These arms are then secured to the projection by means of a cotter pin 114 or like fastener which may either pass through lateral perforations in these arms as shown, or may merely overlie the same. In either case a very secure and efficient fastening will be produced since the projection 15ª will be held by both the pin and the block, while the entrance of foreign matter will be prevented by the overhanging lips.

In Fig. 22 I have illustrated still another application of my invention. In this embodiment a rim 5ᵇ is shown, having at one side a shallow right angular flange 6ᵇ and at the other side a groove 7 of the form illustrated in Fig. 2. Surrounding the rim adjacent the flange 6ᵇ is a ring 120 and surrounding the rim adjacent the groove 7 is a similar ring 121. Both these rings are shown as of the endless type and are held in place merely by friction and by the grip of the tire thereon, although other constructions could be employed without departing from my invention. Both rings are preferably reversible so as to accommodate either "clencher" or "straight-wall" tires. The ring 121 is held in place by a split ring 122 held in the groove 7 by any of the expedients disclosed herein, the projection 15ª thereof being clearly illustrated in this figure.

An important feature of my invention is the shape of the groove 7. Whether or not the inner wall thereof be undercut, as in Fig. 14, the inner edge of the flange wall will be securely held thereby against being rolled up and out thereof by means of the pressure of the air within the tire. Furthermore, the curved formation of the outer wall of this groove translates the stress tending to roll the ring outwardly into a force tending to throw the bottom edge of the other ring inwardly, and this force is firmly withstood by the flat wall of the groove which is one of the strongest parts of the rim. Furthermore, the shape of this groove is one which can very easily be made by rolling and stamping processes, thus permitting the cheap and economical manufacture of my rim.

In case the securing expedient illustrated in Figs. 10 and 14 be employed, the flattened portions 70 can be produced either by cutting away the material of the rim or by upsetting it in dies of the required shape.

It will be noted that substantially all the modifications disclosed herein concern merely the different methods of introducing a filling piece between the end of the projection 15ª and the end of the slot 20. It is obvious that the methods of attaining this end are almost unlimited in number, and I have illustrated herein only such expedients as appear to be of peculiar utility or to possess particular points of merit. It should be understood, however, that I claim as my invention any method of drawing together the ends of the split ring so as to force the toes. 17 beneath the web 21 or of inserting any filling device in said slot, so as to secure the projections 15 and 15ª in engagement with said rim. Furthermore, while I have described my invention in detail and shown it as employed in connection with a pneumatic tire, I do not propose to be limited to such use, as certain features of construction thereof are of more general application. Furthermore, while I have illustrated the split ring 10 as itself forming a tire engaging flange, it is obvious that it might be employed as a retaining collar for a separate tire engaging flange without departing from the scope of my invention. Furthermore, I do not propose to be limited to details of construction except as the same may be positively included in the claims hereto annexed or may be rendered necessary by the prior state of the art. Furthermore, although I have illustrated in my drawings the proportions which I consider best suited to the successful performance of my invention, I do not propose to be limited to such proportions nor to the shape of any of the parts except as specifically limited in the following claims.

Having thus described my invention, what I claim is:

1. A vehicle wheel rim comprising an annular member adapted to be secured to the felly of a wheel and having a pair of slots therethrough, a split ring adapted to surround said member and having a projection adapted to enter each of said slots, each of said projections having a forwardly extending toe adapted to be engaged beneath the surface of said member at the end of the slot into which it is inserted, one of said projections having a total length greater than that of its slot, and the other projection having a less length than its slot, and filling means adapted to be inserted into said latter slot in the rear of said projection.

2. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, each of said projections having a forwardly extending toe adapted to engage beneath said web, and means engaging the rear end of one of said projections for forcing and holding its toe in engagement with said web.

3. A vehicle wheel rim comprising an annular member adapted to be secured about the felly of a wheel and having a groove at one side thereof, said groove having a substantially flat inner face and a rounded outer face, there being slots formed through the bottom of said groove and separated by a web of metal, a split ring formed to fit in said groove and having its extending portion shaped to engage a vehicle tire, projections carried by the inner surface of said ring and adapted to extend through said slots, toes formed on the forward edges of said projections and adapted to engage beneath said web, and means adapted to engage the rearward edges of said projections and force said toes into engagement with said web and simultaneously to draw together the ends of said ring.

4. A vehicle wheel rim comprising an annular member adapted to be secured about the felly of a wheel and having a groove at one side thereof, there being slots formed through the bottom of said groove and separated by a web of metal, a split ring formed to fit in said groove and having its extending portion shaped to engage a vehicle tire, projections carried by the inner surface of said ring adjacent each end thereof, and adapted to extend through said slots, toes formed on the forward edges of said projections and adapted to engage beneath said web, one at least of said slots being longer than the corresponding projection, and a filling block adapted to be interposed between the rearward edge of said projection and the rear end of said slot and hold the toe thereof beneath said web.

5. A vehicle wheel rim comprising an annular member adapted to be secured to the felly of a wheel and having a pair of slots therethrough separated by a metallic web, a split ring adapted to surround said member and having adjacent to each of its ends a projection adapted to enter one of said slots, each of said projections having a forwardly extending toe adapted to be engaged beneath said web, and means for holding said projections with their toes beneath said web.

6. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, each of said projections having a forwardly extending toe adapted to engage beneath said web, means engaging the rear end of one of said projections for holding its toe in engagement with said web, the other projection being of less length than its slot, and means interposed between the rear end of said other projection and the end of its slot for holding the projection in the forward end thereof with its toe underlying said web.

7. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, each of said projections having a forwardly extending toe adapted to engage beneath said web, one at least of said slots being longer than the total length of the corresponding projection, a rivet secured to said annular member and having an enlarged head, a flat spring having a perforation therethrough adapted to receive the head of said rivet and having a notch communicating with said perforation adapted to receive the body thereof, and a block secured to the other end of said spring and held thereby in said longer slot in the rear of said projection so as to retain the toe thereof in engagement with said web at the time when the body of said rivet is received in said notch.

8. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, each of said projections having a forwardly extending toe adapted to engage beneath said web, one at least of said slots being longer than the total length of the corresponding projection, a flat spring detachably secured to said annular member at one end, and a block secured to the other end of said spring and held thereby in said slot in the rear of said projection so as to retain the toe thereof in engagement with said web, said spring being removable from said member only after the withdrawal of said block from said slot.

9. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, each of said projections having a forwardly extending toe adapted to engage beneath said web, one at least of said slots being longer than the total length of the corresponding projection, a rivet secured to said annular member and having a flattened body and an enlarged head, a flat spring having a perforation therethrough adapted to receive said head and a smaller perforation adapted to receive said body and a notch connecting said perforations, said rivet being secured to said annular member with the flat sides of its body portion transverse to the direction thereof, and the width of said notch being sufficient to permit the passage of said body portion, and a block secured to the other end of said spring and held thereby in said longer slot in the rear of said projection so as to retain the toe thereof in engagement with said web.

10. A vehicle wheel rim comprising an annular member adapted to be secured about the felly of a wheel and having a pair of slots therethrough separated by a metallic web, a split ring adapted to surround said annular member and having adjacent each of its ends a projection adapted to enter one of said slots, and having the portion between each projection and the end of the ring cut away, each of said projections having a forwardly extending toe adapted to be engaged beneath said web, one of said slots having a total length greater than that of the body of the corresponding projection but less than that of the body of the projection plus the toe and the other slot being of greater length than the projection plus its toe, and means adapted to be interposed between said second projection and the end of its slot for holding the toe thereof beneath said web.

11. A vehicle wheel rim comprising an annular member adapted to be secured about the felly of a wheel and having a fixed flange at one side and a groove at the other side thereof, said groove having a pair of slots therethrough separated by a metallic web, a split ring adapted to surround said annular member and fit in said groove and having adjacent each of its ends a projection adapted to enter one of said slots and having the portion between each projection and the end of the ring cut away, each of said projections having a forwardly extending toe adapted to be engaged beneath said web, one of said slots having a total length greater than that of the body of the corresponding projection but less than that of the body of the projection plus the toe and the other slot being of greater length than the projection plus its toe, and means for drawing the ends of said ring toward each other and holding said latter toe beneath said web.

12. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, each of said projections having a forwardly extending toe adapted to engage beneath said web, means engaging the rear end of one of said projections for holding its toe in engagement with said web, the other projection being of less length than its slot, a flat spring attached to said annular member and having at its free end a filling block adapted to enter said slot in the rear of said projection and hold said toe in engagement with said web.

13. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, each of said projections having a forwardly extending toe adapted to engage beneath said web, means engaging the rear end of one of said projections for holding its toe in engagement with said web, the other of said slots being longer than the total length of the corresponding projection, a flat spring secured to said annular member and having upon its free end a filling block adapted to enter said second slot in the rear of the projection, the end of said projection being undercut and the adjacent face of said block being complementarily shaped to engage the same.

14. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, each of said projections having a forwardly extending toe adapted to engage beneath said web, means engaging the rear end of one of said projections for holding its toe in engagement with said web, the other of said slots being longer than the total length of the corresponding projection, a flat spring secured to said annular member and having upon its free end a filling block adapted to enter said second slot in the rear of the projection, there being a recess formed between said annular member and spring for the reception of a prying tool.

15. A vehicle wheel rim comprising an annular member adapted to be secured about the felly of a wheel and having a pair of slots therethrough separated by a transverse web, a split ring adapted to surround said member and having a projection adapted to enter each of said slots, means for securing one of said projections in its slot, the other of said projections having a forwardly extending toe adapted to engage beneath said web, the corresponding slot being longer than the total length of last-named projection, and filling means adapted to be inserted into said latter slot in the rear of said projection.

16. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, means for securing one of said projections in its slot, the other of said projections having a forwardly extending toe adapted to engage beneath said web, and means engaging the rear end of said second projection for holding said toe in engagement with said web.

17. A vehicle wheel rim comprising an annular member adapted to be secured about the felly of a wheel and having a fixed flange at one side and a groove at the other side thereof, there being slots formed through the bottom of said groove and separated by a web of metal, a split ring formed to fit in said groove and having its extending portion shaped to engage a vehicle tire, projections carried by the inner surface of said ring adjacent each end thereof, means for securing one of said projections in one of said slots, the other of said projections having a forwardly extending toe adapted to be projected through said slot and engaged beneath said web, and a filling block adapted to be interposed between the rearward edge of said projection and the rear end of said slot so as to hold said toe beneath said web.

18. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, means for securing one of said projections in said slot, the other of said projections having a forwardly extending toe adapted to engage beneath said web, the other slot being longer than the total length of its projection, a flat spring detachably secured to said annular member at one end, and a block secured to the other end of said spring and held thereby in said slot in the rear of said projection so as to retain the toe thereof in engagement with said web.

19. A vehicle wheel rim comprising an annular member adapted to be secured about the felly of a wheel and having a pair of slots therein separated by a transverse web, a split ring adapted to surround said member and having adjacent to each of its ends a projection adapted to enter one of said slots, means for securing one of said projections in its slot, the other of said projections having a forwardly extending toe adapted to engage beneath said web, the other of said slots being longer than the total length of said projection, a flat spring secured to said annular member and having upon its free end a filling block adapted to enter said second slot in the rear of the projection, the end of said projection being undercut and the adjacent face of said block being complementarily shaped to engage the same.

In testimony whereof, I hereunto affix my signature in the presence of two witnesses.

RICHARD S. BRYANT.

Witnesses:
HAROLD E. SMITH,
ALBERT H. BATES.

Copies of this patent may be obtained for five cents each, by addressing the "Commissioner of Patents, Washington, D. C."